United States Patent
Yoon et al.

(10) Patent No.: US 10,634,578 B2
(45) Date of Patent: Apr. 28, 2020

(54) APPARATUS AND METHOD OF DETECTING LEAKAGE OF PIPE BY USING DISTANCE DIFFERENCE-FREQUENCY ANALYSIS

(71) Applicant: KOREA ATOMIC ENERGY RESEARCH INSTITUTE, Daejeon (KR)

(72) Inventors: Doo-Byung Yoon, Daejeon (KR); Jin-Ho Park, Daejeon (KR); Jeong Han Lee, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/242,243

(22) Filed: Jan. 8, 2019

(65) Prior Publication Data

US 2019/0383691 A1 Dec. 19, 2019

(30) Foreign Application Priority Data

Jun. 14, 2018 (KR) .................. 10-2018-0068216

(51) Int. Cl.
*G01M 3/24* (2006.01)
*G06F 17/15* (2006.01)

(52) U.S. Cl.
CPC ........... *G01M 3/243* (2013.01); *G06F 17/156* (2013.01)

(58) Field of Classification Search
CPC .............................. G01M 3/243; G06F 17/156
(Continued)

(56) References Cited

U.S. PATENT DOCUMENTS

| 5,333,501 A * | 8/1994 | Okada ................... | G01M 3/243 |
| | | | 73/40.5 A |
| 6,453,247 B1 * | 9/2002 | Hunaidi ................ | G01M 3/243 |
| | | | 702/51 |

(Continued)

FOREIGN PATENT DOCUMENTS

| CN | 104747912 | 4/2017 |
| EP | 0552044 | 7/1993 |

(Continued)

OTHER PUBLICATIONS

UKIPO, Combined Search and Examination Report of GB1908475.5 dated Dec. 10, 2019.

*Primary Examiner* — Jack K Wang
(74) *Attorney, Agent, or Firm* — Lex IP Meister, PLLC

(57) ABSTRACT

An apparatus for detecting leakage of a pipe by using a distance difference-frequency analysis includes: vibration detecting sensors, which are mounted at a predetermined distance in a longitudinal direction of a pipe and are configured to measure vibration signals of the pipe; and a control unit, which is configured to calculate a cross-correlation function by using the vibration signals, to reveal time delay information in the frequency domain by calculating time-delay frequency analysis diagram for the cross-correlation function, to calculate a distance difference-frequency analysis diagram by applying compensation conversion using frequency-dependent propagation speed information to the time-delay frequency analysis diagram, and to detect a leakage component of the pipe in the distance difference-frequency analysis diagram.

8 Claims, 6 Drawing Sheets

(58) Field of Classification Search
USPC .......................................................... 340/605
See application file for complete search history.

(56) References Cited

U.S. PATENT DOCUMENTS

| | | | | |
|---|---|---|---|---|
| 2017/0102286 A1* | 4/2017 | Inoue | ..................... | G01N 29/14 |
| 2017/0322104 A1* | 11/2017 | Mataga | ..................... | G01H 1/06 |
| 2018/0045687 A1* | 2/2018 | Tominaga | ................ | G01M 3/02 |
| 2018/0292292 A1* | 10/2018 | Takahashi | ............. | G01M 99/00 |

FOREIGN PATENT DOCUMENTS

| | | |
|---|---|---|
| JP | 10-185745 | 7/1998 |
| JP | 11-201858 | 7/1999 |
| JP | 11-248591 | 9/1999 |
| JP | 2000-292302 | 10/2000 |
| JP | 3639160 | 4/2005 |
| JP | 2006-003311 | 1/2006 |
| JP | 2006-161791 | 6/2006 |
| JP | 4963240 | 6/2012 |
| JP | 2013-061350 | 4/2013 |
| JP | 2016-095231 | 5/2016 |
| KR | 10-0792756 | 1/2008 |
| KR | 10-0817617 | 3/2008 |
| KR | 10-2013-0064403 | 6/2013 |
| KR | 10-1783248 | 9/2017 |
| KR | 10-2018-0110543 | 10/2018 |
| WO | 2011-021039 | 2/2011 |
| WO | 2014-050618 | 8/2016 |

* cited by examiner

APPARATUS AND METHOD OF DETECTING LEAKAGE OF PIPE BY USING DISTANCE DIFFERENCE-FREQUENCY ANALYSIS

CROSS-REFERENCE TO RELATED APPLICATION

This application claims priority to and the benefit of Korean Patent Application No. 10-2018-0068216 filed in the Korean Intellectual Property Office on Jun. 14, 2018, the entire contents of which are incorporated herein by reference.

BACKGROUND OF THE INVENTION (a) Field of the Invention

An apparatus and a method of detecting leakage of a pipe by using a distance difference-frequency analysis are provided.

(b) Description of the Related Art

In the case of a plant including a power plant, leakage may be generated in a pipe due to aging of the pipe installed at an initial construction. A method mainly used for detecting leakage of a pipe is a method using a cross-correlation function. In a situation, such as a power plant, in which a pump, a motor, and the like are continuously operated, a noise component by a machine operation influences a cross-correlation function. Accordingly, when a general cross-correlation function is used, it may be difficult to determine the truth of the leakage.

There is developed a technology of estimating leakage by using a phase information slope of a cross-spectrum in an ambient noise environment by a machine operation of a plant. However, the method may be effectively applied to the case where leakage is incurred at one place, and may be difficult to be applied to the case where leakage is incurred at the plurality of places. Accordingly, there is a demand for a technology of determining leakage, which is applicable even to the case where leakage is incurred at the plurality of places in an environment having noise by a machine operation.

As a relevant prior art literature, Japanese Patent Application Laid-Open No. 1999-201858 discloses "Method of measuring vibration of Pipeline System by using Correlation Method", Japanese Patent No. 3,295,682 discloses "Method of Processing signal of Pipe leakage Position Specifying Method", and Japanese Patent No. 3,639,160 discloses "Apparatus for Detecting Abnormal Part".

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment has been made in an effort to provide an apparatus and a method of detecting leakage of a pipe by using a distance difference-frequency analysis, which are capable of improving reliability for determination of the truth of leakage by using a distance difference-frequency analysis even in the case where the plurality of leakage exists in an environment, in which machine operation noise is transferred to a pipe. An exemplary embodiment provides an apparatus for detecting leakage of a pipe by using a distance difference-frequency analysis, the apparatus including: vibration detecting sensors, which are mounted at a predetermined interval in a longitudinal direction of a pipe and measure vibration signal of the pipe; and a control unit, which is configured to calculate a cross-correlation function by using the vibration signals, to reveal time delay information in the frequency domain by calculating time-delay frequency analysis diagram for the cross-correlation function, to calculate a distance difference-frequency analysis diagram by applying compensation conversion using frequency-dependent propagation speed information to the time-delay frequency analysis diagram, and to detect a leakage component of the pipe in the distance difference-frequency analysis diagram.

According to the exemplary embodiment, even when the plurality of leakage is generated in a pipe, it is possible to visualize a feature for a leakage of the pipe by using a distance difference-frequency analysis and more accurately determine truth of the leakage and estimate the leakage.

According to the exemplary embodiment, even in an environment, in which machine operation noise is transferred to a pipe, a leakage component is expressed in the form of a vertical line and machine operation noise of rotating machinery is expressed in the form of a horizontal line, so that it is possible to more efficiently estimate leakage.

DETAILED DESCRIPTION OF THE EMBODIMENTS

Figure 1:
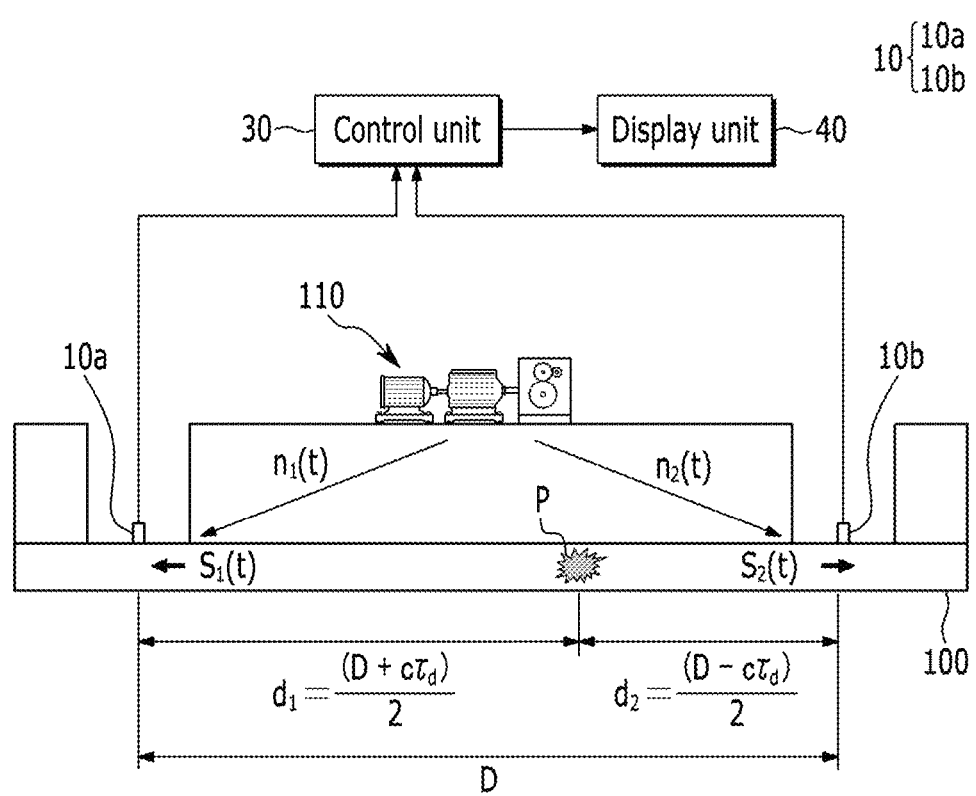
FIG. 1 is a diagram illustrating an apparatus for detecting leakage of a pipe by using a distance difference-frequency analysis according to an exemplary embodiment.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification. Further, a detailed description of a widely known published technology will be omitted.

Throughout the specification, unless explicitly described to the contrary, the word "comprise" and variations such as "comprises" or "comprising", will be understood to imply the inclusion of stated elements but not the exclusion of any other elements.

Hereinafter, an apparatus and a method of detecting a leakage of a pipe according to an exemplary embodiment will be described.

FIG. 1 is a diagram illustrating an apparatus for detecting leakage of a pipe by using a distance difference-frequency analysis according to an exemplary embodiment. Referring to FIG. 1, the apparatus for detecting leakage of a pipe by using a distance difference-frequency analysis according to the exemplary embodiment includes a vibration detecting sensor 10, a control unit 30, and a display unit 40, and may detect and localize a leakage of a pipe 100 by using a distance difference-frequency analysis, thereby improving reliability of determination of the truth of leakage even in the case where there is the plurality of leakage in an environment having machine operation noise, compared to the method according to the related art.

First, the vibration detecting sensors 10 are installed at a predetermined interval in a longitudinal direction of the pipe 100 to detect a vibration signal transferred from the pipe 100. The vibration detecting sensors 10 may be mounted to be located at both sides of a leakage position P, at which leakage is expected to be generated in the pipe 100. The vibration detecting sensors 10 may be installed at both ends in the longitudinal direction of the pipe 100, respectively. The vibration detecting sensors 10 may detect vibration signals ($x_1(t)$ and $x_2(t)$), in which the leakage signal propagated from the leakage position P of the pipe 100 and a signal transferred from rotating machinery 110 are mixed. In this case, an ultrasonic signal or a sound signal measured by using a microphone may be applied for recognizing the leakage position P, but the present invention is not limited thereto.

The control unit 30 calculates a cross-correlation function by using the vibration signal measured by the vibration detecting sensor 10. The control unit 30 performs a time delay-frequency analysis for the calculated cross-correlation function and reveals time delay information in the frequency domain. Further, the control unit 30 applies compensation conversion using the relation between distance difference, time delay and frequency-dependent propagation speed information to the time-delay frequency analysis diagram, and then calculates a distance difference-frequency analysis diagram. The control unit 30 detects a leakage component of the pipe 100 in the calculated distance difference-frequency analysis diagram and generates a leakage position display signal. The control unit 30 may include a microprocessor, which performs a general control operation related to the detection and the processing of the leakage position P of the pipe 100. The control unit 30 may be connected with a general computer and share relevant information. The control unit 30 may include a separate memory unit. The memory unit may store information calculated and processed by the control unit 30, and data related to the detection and the localization of the leakage position P of the pipe 100.

The display unit 40 displays the leakage position P of the pipe 100 based on the leakage position display signal input from the control unit 30. The display unit 40 may display whether an abnormal part corresponding to the leakage position P of the pipe 100 exists and specified signals. The display unit 40 may visually display the leakage component of the pipe 100 in a distance difference-frequency domain with a vertical line. Further, noise of the rotating machinery 110 is displayed with a horizontal line, so that it is possible to easily determine leakage compared to the method according to the related art. In other words, an examiner may see the leakage position P of the pipe 100 with the eye through the display unit 40 and easily determine the leakage.

Figure 2:
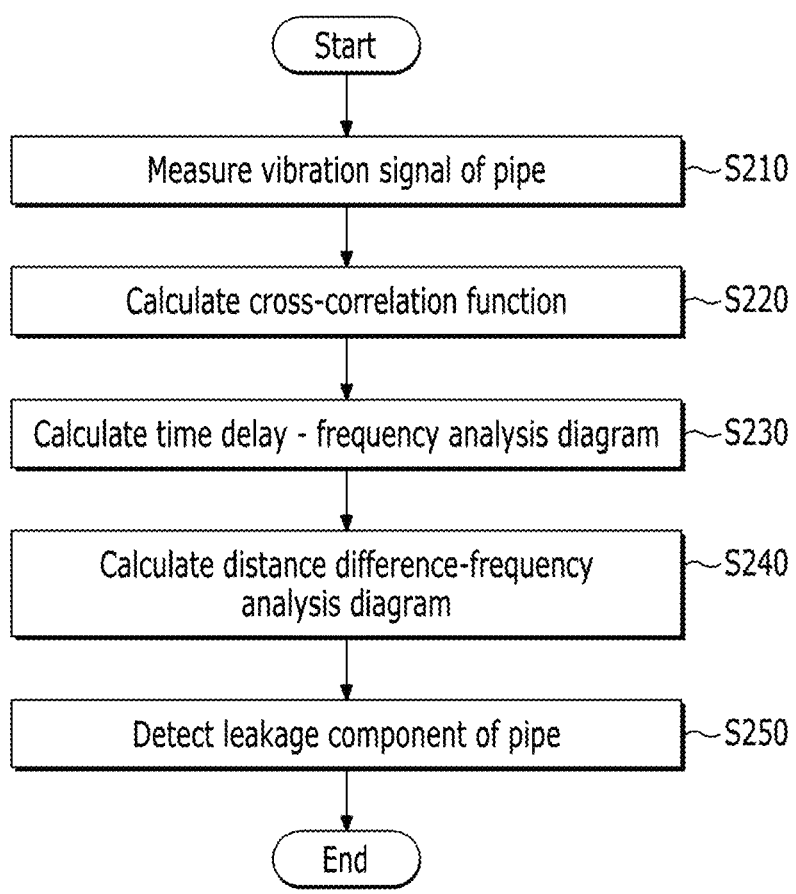
FIG. 2 is a flowchart illustrating a method of detecting leakage of a pipe by using a distance difference-frequency analysis according to an exemplary embodiment.
Figure 3:
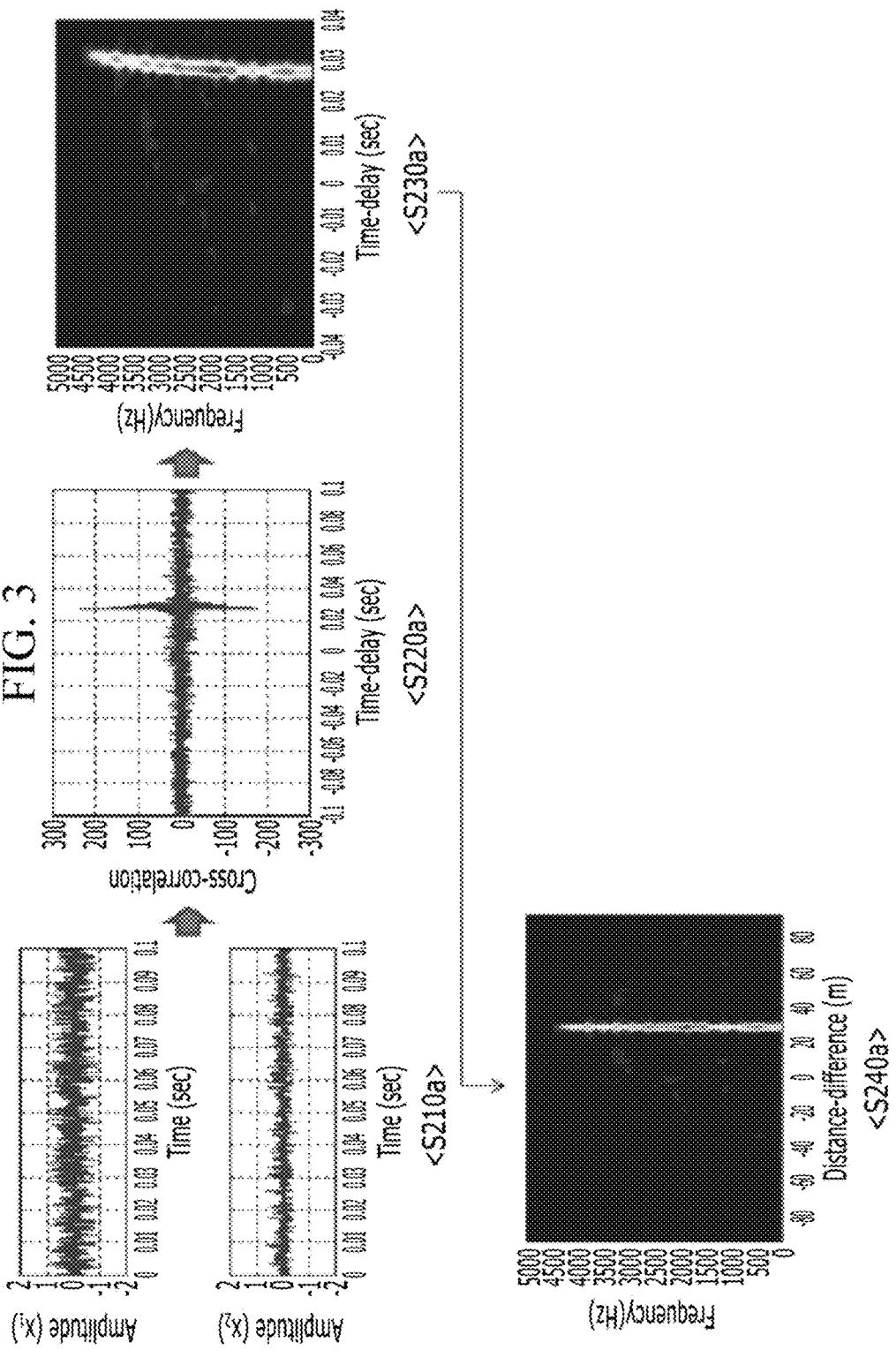
FIG. 3 is a flowchart illustrating a display of a process of detecting leakage of a pipe by using a distance difference-frequency analysis on a display unit according to the exemplary embodiment.
Figure 4:
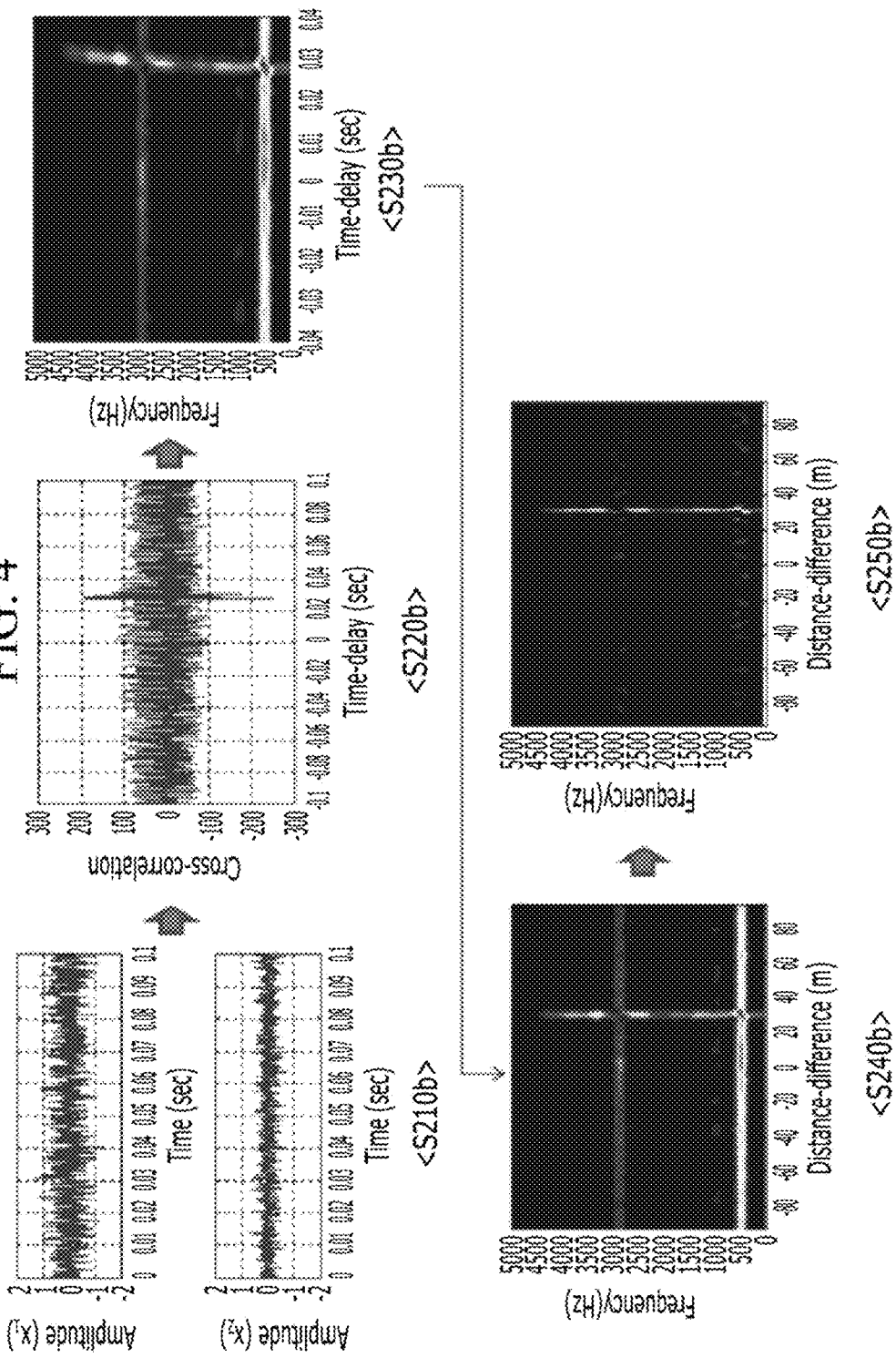
FIG. 4 is a flowchart illustrating a display of a process of detecting a leakage component of a pipe by using a distance difference-frequency analysis on a display unit when there is a noise signal of rotating machinery transferred to the pipe according to the exemplary embodiment.

FIG. 2 is a flowchart illustrating a method of detecting leakage of a pipe by using a distance difference-frequency analysis according to an exemplary embodiment, FIG. 3 is a flowchart illustrating a display of a process of detecting leakage of a pipe by using a distance difference-frequency analysis on the display unit 40 according to the exemplary embodiment, and FIG. 4 is a flowchart illustrating a display of a process of detecting a leakage component of a pipe by using a distance difference-frequency analysis on the display unit 40 when there is a noise signal of the rotating machinery 110 transferred to the pipe 100 according to the exemplary embodiment.

The method of detecting leakage of a pipe by using a distance difference-frequency analysis according to the exemplary embodiment will be described with reference to FIGS. 1 to 4.

First, the control unit 30 measures vibration signals of the pipe 100 measured by the vibration detecting sensors 10, which are installed at both ends of the pipe 100, in order to determining the truth of leakage at the leakage position P of the pipe 100 (S210). Then, the control unit 30 calculates a cross-correlation function by using the measured vibration signals of the pipe 100 (S220). The control unit 30 may measure the vibrations signals ($x_1(t)$ and $x_2(t)$) by using the vibration detecting sensors 10, which are installed at both ends of the pipe 100, and calculate a cross-correlation function ($C_{12}(\tau)$) by using the measured vibration signals. The vibration detecting sensors 10 are mounted to be located at both sides of the expected leakage position P as illustrated in FIG. 1 and detect a leakage signal propagated from the leakage position P and ambient noise signals ($n_1(t)$ and $n_2(t)$) propagated from the rotating machinery 110.

A first leakage signal ($s_1(t)$) may propagate to a first vibration detecting sensor 10a from the leakage position P. Further, a first machinery noise signal ($n_1(t)$) may propagate from the rotating machinery 110. Further, a second leakage signal ($s_2(t)$) may propagate to a second vibration detecting sensor 10b from the leakage position P. Further, a second machinery noise signal ($n_2(t)$) may propagate from the rotating machinery 110. A first vibration signal ($x_1(t)$), in which the first leakage signal ($s_1(t)$) and the first machinery noise signal ($n_1(t)$) are mixed, may propagate to the first vibration detecting sensor 10a. Further, a second vibration signal ($x_2(t)$), in which the second leakage signal ($s_2(t)$) and the second machinery noise signal ($n_2(t)$) are mixed, may propagate to the second vibration detecting sensor 10b. The first vibration signal ($x_1(t)$) and the second vibration signal ($x_2(t)$) may be represented by Equation 1.

$$x_1(t)=s_1(t)+n_1(t), x_2(t)=s_2(t)+n_2(t) \quad \text{(Equation 1)}$$

It is possible to calculate a time delay ($\tau_d$) by calculating the cross-correlation function based on the vibration signals ($x_1(t)$ and $x_2(t)$), and estimate the leakage position P of the pipe 100 through the time delay ($\tau_d$). In this case, Equation 2 may be applied.

$$d_1-d_2=c\tau_d$$

$$d_1=(D+c\tau_d)/2, d_2=(D-c\tau_d)/2, \quad \text{(Equation 2)}$$

Herein, $d_1$ is a distance from the leakage position P to the first vibration detecting sensor, $d_2$ is a distance from the leakage position P to the second vibration detecting sensor, D is a distance between the first vibration detecting sensor and the second vibration detecting sensor, and c is a propagation speed of the vibration signal in the pipe 100.

As described above, the cross-correlation function calculated based on the vibration signals ($x_1(t)$ and $x_2(t)$) may be represented by Equation 3.

$$C_{12}(\tau) = E[x_1(t) x_2(t+\tau)] \quad \text{(Equation 3)}$$

Herein, E[ ] represents an expected value and τ represents a time delay.

Next, the control unit 30 calculates time-delay frequency analysis diagram for the cross-correlation function, and reveals time delay information in the frequency domain $C_{12}(\tau,f)$ of the cross-correlation function (S230). In this case, in the time delay-frequency analysis process, a method, such as Wigner Ville distribution or short time Fourier transform (STFT) for the cross-correlation function, may be used. As a result of an actual experiment, in the time delay-frequency analysis operation, as a frequency is higher, bending of a vertical component is larger.

In the meantime, the control unit 30 applies compensation conversion (δ=cτ) using a frequency-dependent propagation speed information (c(f)) to $C_{12}(\tau,f)$ representing the cross-correlation function dependent on the time delay information and the frequency, and then calculates a distance difference-frequency analysis diagram ($D_{12}(\delta,f)$) for each frequency (S240).

The frequency-dependent propagation speed may be represented by Equation 4.

$$c(f) = c_f \left( 1 + \frac{(2B_f)/r}{Eh/r^2 - \text{ph}(2\pi f)^2} \right)^{-\frac{1}{2}} \quad \text{(Equation 4)}$$

Herein, $c_f$ represents a sound speed of a fluid, $B_f$ represents bulk modulus of elasticity, r represents a radius of the pipe, h represents a thickness of the pipe, E represents Young's modulus of a material of the pipe, ρ represents density of the pipe, and f represents frequency.

In this case, the leakage component of the pipe 100 has a characteristic that broadband frequency components are simultaneously generated, so that a broadband frequency component exists for a distance difference (δ) corresponding to the leakage position P of the pipe 100 in $D_{12}(\delta,f)$, and is displayed on the display unit 40 in the form of a vertical line in $D_{12}(\delta,f)$. The leakage component of the pipe 100 is displayed on the display unit 40 in the form of the vertical line, but a noise component by a continuously operated rotating machinery and the like is displayed on the display unit 40 in the form of a horizontal line. Accordingly, the leakage component of the pipe 100 may be easily detected by adopting a method of effectively detecting a vertical component displayed on the display unit 40 (S250). For example, the method of effectively detecting the vertical component displayed on the display unit 40 includes a vertical edge detection method. The distance difference-frequency analysis diagram is calculated by the compensation conversion using the relation between distance difference, time delay and frequency-dependent propagation speed information (δ=c τ), and the vertical edge detection method is applied to the distance difference-frequency analysis diagram, so that the leakage component existing for a distance difference-frequency diagram corresponding to the leakage position P of the pipe 100 may be easily and efficiently detected. When the vertical component displayed on the display unit 40 is not bent and is vertical, the position P, at which the leakage is generated in the pipe 100, may be determined. However, when the vertical component displayed on the display unit 40 is not vertical, for example, the vertical component is considerably bent or maintains in an oblique form, it may be determined that the leakage is not generated in the pipe 100.

FIG. 4 is a flowchart illustrating a display of a process of detecting a leakage component of the pipe by using a distance difference-frequency analysis on the display unit 40 when there is a noise signal of the rotating machinery transferred to the pipe according to the exemplary embodiment. Referring to FIG. 4, when the distance difference-frequency analysis method according to the exemplary embodiment is applied, the leakage component is visually represented with a vertical line in a distance difference-frequency domain, but noise of the rotating machinery 110 is represented with a horizontal line, so that it is possible to easily determine the leakage position P of the pipe 100 compared to the method according to the related art.

However, in the case of the method using the cross-correlation function according to the related art, as operation noise of the rotating machinery 110 is increased, it is difficult to detect the leakage position P of the pipe 100.

Figure 5:
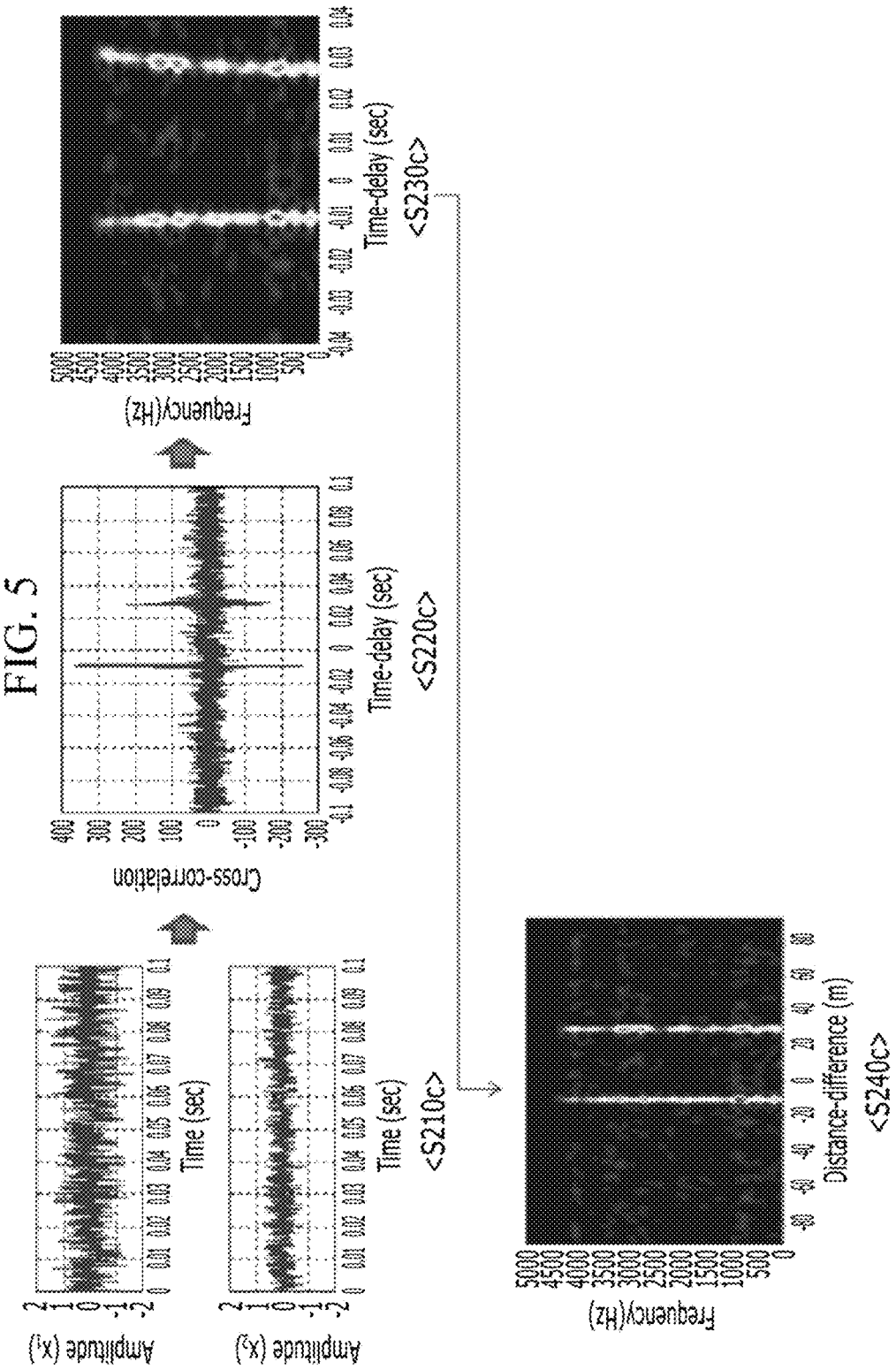
FIG. 5 is a flowchart illustrating a display of a process of detecting a leakage component of a pipe by using a distance difference-frequency analysis on a display unit when the plurality of leakage is generated in the pipe according to the exemplary embodiment.
Figure 6:
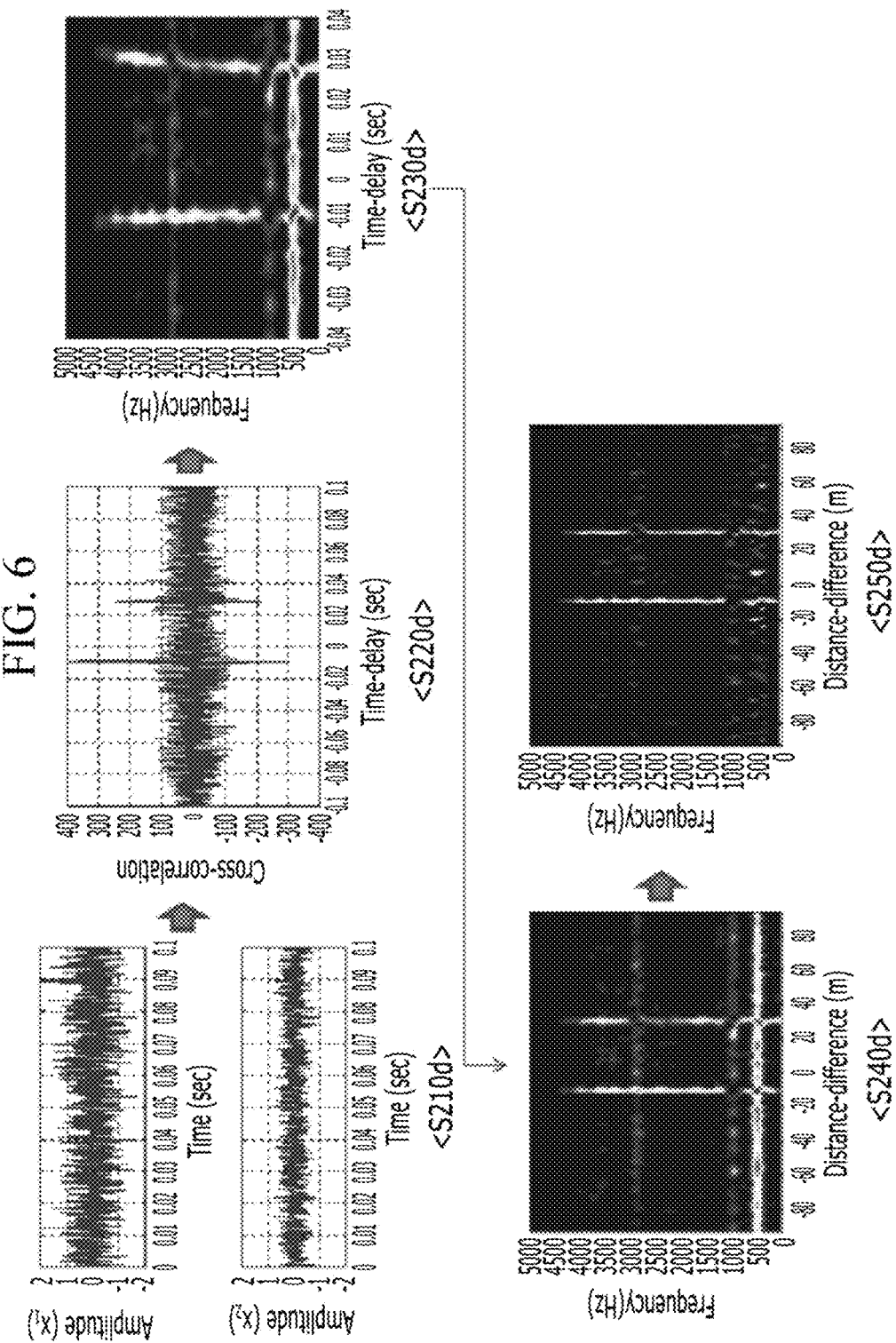
FIG. 6 is a flowchart illustrating a display of a process of detecting a leakage component of a pipe by using a distance difference-frequency analysis on a display unit when the plurality of leakage is generated in the pipe in the situation where there is a noise signal of the rotating machinery transferred to the pipe according to the exemplary embodiment.

FIG. 5 is a flowchart illustrating a display of a process of detecting a leakage component of a pipe by using a distance difference-frequency analysis on the display unit when the plurality of leakage is generated in the pipe according to the exemplary embodiment, and FIG. 6 is a flowchart illustrating a display of a process of detecting a leakage component of a pipe by using a distance difference-frequency analysis on the display unit when the plurality of leakage is generated in the pipe in the situation where there is a noise signal of the rotating machinery transferred to the pipe according to the exemplary embodiment.

Referring to FIGS. 5 and 6, even when the number of leakage positions P is two or more during the detection of the leakage position P in the pipe 100, or noise by the rotating machinery 110 is large, the leakage position P of the pipe 100 may be accurately displayed with the vertical component. Due to the leak of the pipe 100, the broadband frequency component is simultaneously generated at the leakage position P of the pipe 100, and this leak component (broadband frequency component) propagated from the leakage position P of the pipe 100. This broadband frequency component is displayed on the display unit 40 in the form of the vertical lines in the distance difference-frequency analysis diagram ($D_{12}(\delta,f)$). Even when the number of leakage positions P is two or more or noise by the rotating machinery 110 is large, the leakage component of the pipe 100 is clearly displayed on the display unit 40 in the form of the vertical line, so that it is possible to accurately diagnose the leakage position P of the pipe 100.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for detecting leakage of a pipe by using a distance difference-frequency analysis, the apparatus comprising:

vibration detecting sensors, which are mounted at a predetermined distance in a longitudinal direction of a pipe and are configured to measure vibration signals ($x_1(t)$ and $x_2(t)$) of the pipe; and a control unit, which is configured to calculate a cross-correlation function ($C_{12}(\tau,f)$) by using the vibration signals, to reveal time delay information in the frequency domain by calculating time-delay frequency analysis diagram for the cross-correlation function, to calculate a distance difference-frequency analysis diagram ($D_{12}(\delta,f)$) by applying compensation conversion using frequency-dependent propagation speed information ($c(f)$) to the time-delay frequency analysis diagram, and to detect a leakage component of the pipe in the distance difference-frequency analysis diagram ($D_{12}(\delta,f)$), wherein the cross-correlation function $C_{12}(\tau)$ is calculated by an Equation below:

$$C_{12}(\tau)=E[x_1(t)x_2(t+\tau)]$$

Herein, $E[\ ]$ represents an expected value and $\tau$ represents a time delay.

2. The apparatus of claim 1, wherein:
the control unit is configured to detect the leakage component of the pipe and to generate a leakage position display signal.

3. The apparatus of claim 2, further comprising:
a display unit, which is configured to display the leakage position of the pipe based on the leakage position display signal.

4. A method of detecting leakage of a pipe by using a distance difference-frequency analysis, the method comprising:

measuring vibration signals ($x_1(t)$ and $x_2(t)$) from one pair of vibration detecting sensors, which are mounted at both sides in a longitudinal direction of a pipe, respectively;

calculating a cross-correlation function ($C_{12}(\tau,f)$) by using the vibration signals;

revealing time delay information in the frequency domain by calculating time-delay frequency analysis diagram for the cross-correlation function;

calculating a distance difference-frequency analysis diagram ($D_{12}(\delta,f)$) by applying compensation conversion using frequency-dependent propagation speed information ($c(f)$) to the time-delay frequency analysis diagram; and detecting a leakage component of the pipe in the distance difference-frequency analysis diagram ($D_{12}(\delta,f)$).

5. The method of claim 4, wherein:
the cross-correlation function ($C_{12}(\tau)$) is calculated by an Equation below:

$$C_{12}(\tau)=E[x_1(t)x_2(t+\tau)]$$

Herein, $E[\ ]$ represents an expected value and $\tau$ represents a time delay.

6. The method of claim 4, wherein:
The frequency-dependent propagation speed information ($c(f)$) is calculated by an Equation below:

$$c(f) = c_f \left(1 + \frac{(2B_f)/r}{Eh/r^2 - \rho h(2\pi f)^2}\right)^{-\frac{1}{2}}$$

Herein, $c_f$ represents a sound speed of a fluid, $B_f$ represents bulk modulus of elasticity, r represents a radius of the pipe, h represents a thickness of the pipe, E represents Young's modulus of a material of the pipe, $\rho$ represents density of the pipe, and f represents frequency.

7. The method of claim 4, wherein:
the time delay-frequency analysis uses a method of Wigner Ville distribution or short time Fourier transform (STFT) for the cross-correlation function.

8. The method of claim 4, further comprising:
displaying a leakage position of the pipe using a vertical edge detection method.

* * * * *